United States Patent

[11] 3,595,537

| [72] | Inventor | Joseph Richard Kaelin<br>Villa Seeburg, Buochs, Nidwalden,<br>Switzerland |
|---|---|---|
| [21] | Appl No. | 778,695 |
| [22] | Filed | Nov. 25, 1968 |
| [45] | Patented | July 27, 1971 |
| [32] | Priority | Dec. 4, 1967 |
| [33] | | Switzerland |
| [31] | | 16998/67 |

[54] APPARATUS FOR SEWAGE TREATMENT
6 Claims, 3 Drawing Figs.

[52] U.S. Cl. .................................................. 261/91, 9/8 R, 210/242, 261/120
[51] Int. Cl. ....................................................... B01f 7/16
[50] Field of Search............................................ 261/87, 93, 120; 91; 239/16, 17, 22, 23; 9/8; 210/242

[56] References Cited
UNITED STATES PATENTS

| 3,235,877 | 2/1966 | Grob | 239/17 X |
| 3,288,295 | 11/1966 | Kelly | 210/194 |
| 3,395,803 | 8/1968 | Sumimoto | 210/242 X |

Primary Examiner—Tim R. Miles
Assistant Examiner—Steven H. Markowitz
Attorney—Marechal, Biebel, French & Bugg ABSTRACT: A sewage treatment system comprises a tank containing sewage to be aerated and circulated by an aeration rotor partially immersed in the liquid in the tank. The aeration rotor is suspended from a floating carrier frame including a platform supporting the driving motor for the aerator and a plurality of supporting rods extending in radial planes outwardly and downwardly inclined from said platform. The supporting rods extend with their outer ends through rough spherical floating bodies floating on the liquid to be treated in the tank. The free ends of the supporting rods projecting beyond said floating bodies are guided in vertical guide channels formed on the internal tank wall to hold said carrier frame against rotation in said tank but permitting unrestrained upwards and downward movement of the carrier frame according to the level of the sewage in the tank.

APPARATUS FOR SEWAGE TREATMENT

CROSS REFERENCE TO RELATED APPLICATION

An aeration system particularly designed for aeration or cleaning the water in rivers, lakes and along beaches and shores is described in my copending U.S. application Ser. No. 658,766, now U.S. Pat. No. 3,462,132.

This invention relates to a sewage aeration system of the type including a motor-driven aeration rotor mounted on a substantially vertical axis for partial immersion in the liquid to be aerated and comprising a floating carrier frame for said rotor, said carrier frame including a platform supporting the driving motor above the level of the liquid to be aerated, and a plurality of supporting rods secured to said platform and extending in radial planes outwardly and downwardly inclined from said platform with their ends immersed in the liquid. Each of said supporting rods has a floating body attached thereto, whereby said motor-supporting platform is maintained in floating condition at a constant height with respect to the level of the liquid to be aerated.

The object of the present invention is the provision of a aeration system which may be used with advantage in the treatment of sewage in aeration tanks in which the level of the liquid in the tank is subject to frequent variations, so that the use of a fixed position aeration system is inconvenient, since for efficient operation of the aeration system, the aeration rotor should always occupy a constant height with respect to the level of the liquid in the tank.

According to the present invention said floating bodies mounted on each of said supporting rods for holding the platform which carries the motor and the aeration rotor in floating condition above the liquid level are mounted for longitudinal displacement along said rods, means being provided for securing said floating bodies in longitudinally adjustable positions on said supporting rods for varying the depth of immersion of said aeration motor into the liquid.

The invention will now be described in detail with reference to the accompanying drawings.

Figure 1:
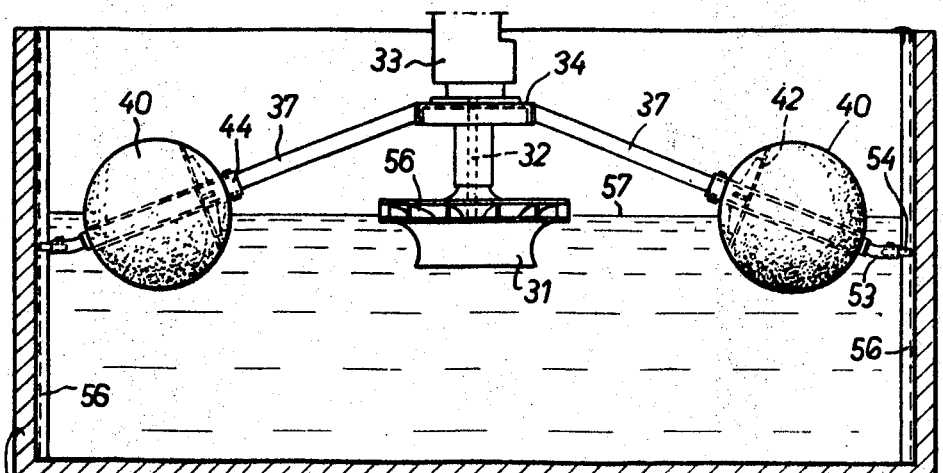
FIG. 1 is a vertical section through an aerating tank for treatment of sewage, an aeration rotor being arranged to float in the liquid in the tank.
Figure 2:
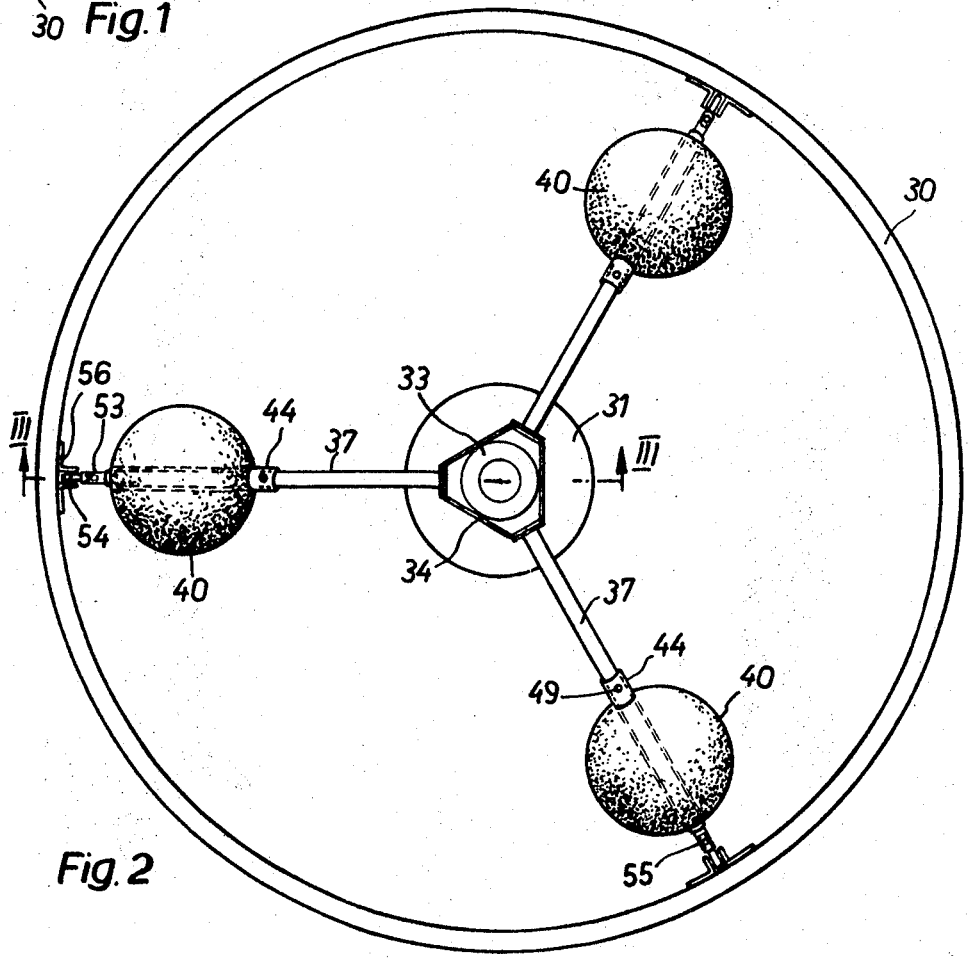
FIG. 2 is a plan view of the aerating tank and the floating system from which the aeration rotor is suspended.

The represented sewage treatment plant comprises an aerating tank 30 for aeration of sewage in the tank by means of an aeration rotor 31 of known design suspended on a vertical shaft 32 which is driven by a driving unit 33 including an electric motor and a gear. The driving unit is mounted on a triangular-shaped platform 34 provided with a central opening 35 (FIG. 3) for the passage of the driving shaft 32. The platform 34 is provided with a downwardly extending circumferential flange 36. Three supporting posts 37 are each secured to one of the flat corners of the triangular platform 34. The upper end of each post is provided with an end flange 38 which is secured by means of screws 39 to the depending circumferential flange 36 of the platform. Each of the three supporting posts 37 carries a spherical float 40. The floats are pushed over the lower ends of the supporting posts and are fixed thereto so as to be longitudinally adjustable along the posts. It will be understood that by longitudinally displacing the floats along the posts, the height of the supporting platform 34 above the liquid level 41 can be adjusted and the rotor 31 can be immersed to the desired depth into the liquid in the tank.

Figure 3:
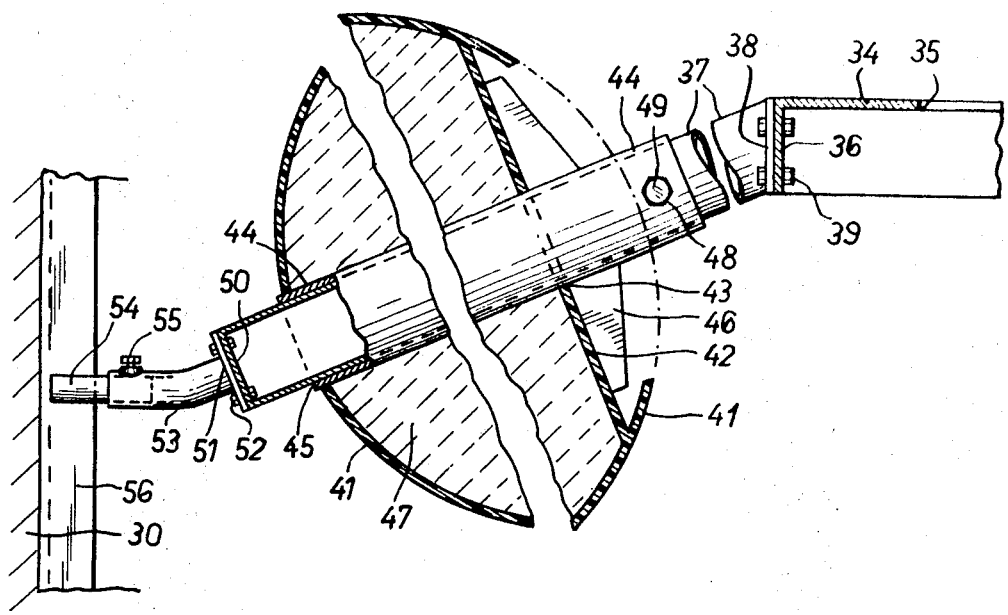
FIG. 3 is a longitudinal section through one of the supporting posts of the floating system taken along the line III-III of FIG. 2, and drawn to a larger scale.

The manner of mounting the floating bodies 40 to the posts 37 is more clearly shown in FIG. 3. The spherical floating body 40 is formed by an outer hollow sphere 41 preferably consisting of plastic material. The sphere 41 has a calotte removed whereby a flat surface 42 is formed extending at right angles to the axis of the post 37, this flat surface being provided with a central circular opening 43. A guide tube 44 is introduced into the sphere 41 through the opening 43 and extends diametrically through the sphere to project out through an opening 45 on the opposite side of the sphere. The guide tube 44 carries a number of fixed radial arms 46, for example four or six arms bearing against the flat wall 42 to maintain the tube 44 in its position in the sphere. The space defined by the walls 41 and 44 is filled with a synthetic foam material 47 so that the spherical body cannot sink when floating in the tank 30, even if the external skin 41, 42 would be damaged. After the guide tube 44 has been inserted in its position within the sphere, and the foam material has been produced by foaming a corresponding plastics mixture, preferably directly within the hollow sphere, the space outside of the wall 42 and between and above the radial arms 46 is filled out with a plastic thermosetting material, so that the finished floating body 40 forms a complete ball, with the guide tube 44 projecting out of the sphere. The portion of the tube extending out of the sphere is formed with one or more peripheral lugs 48 provided with a threaded hole for introducing a clamping screw 49.

One such floating body 40 is slid over each of the posts 37, the post passing through the guide tube 44, and then the floating body is fixed to post by means the clamping screws 49 introduced through the thread holes of the lugs 48. The lower end of the tubular post 37 is closed by means of a cover 50 welded to the tube. A tubular bend 53 having a flange 51 is secured to the cover 50 by means of screws 52. A guide pin 54 is inserted into the open end of the tubular bend 53 and held therein by means of a clamping screw 55. The guide pin 54 is engaged in a vertical channel formed between two angle rails 56 secured to the wall of the tank 30. Since such aerating tanks frequently are made of concrete and the diameters of the tanks can vary within certain tolerances, the guide pin 54 is slidably inserted in the tubular bend 53. When the screw 55 is loosened, the pin 54 can be moved into or out of the bend 53 so as to obtain a safe engagement of the pin between the two rails 56.

The aerating tank 30 can also be formed of glass fiber-reinforced synthetic resin material, so as to be of light weight, corrosion resistant and easily transportable.

It results from the description of the represented aeration plant that the rotor 31 can move upwardly and downwardly without any constraint, according to the level of liquid in the tank, and that the depth of immersion of the rotor 31 into the liquid, after adjustment by positioning of the floating bodies 40 along the posts 37, remains constant. When, however, the depth of immersion of the rotor 31 shall be modified, i.e. when the outlets 56 of the liquid guide channels in the rotor shall be situated slightly higher or lower with respect to the liquid level 57 in the tank according to the desired operating conditions, it is only necessary to loosen the clamping screws 49 by which the guide tubes 44 are secured to the posts 37, and to slightly displace the floating spheres 40 longitudinally of the posts in one or the other direction. A displacement of the spheres upwardly and inwardly along the posts 37 will result in a lowering of the platform 34 with respect to the liquid level 57 in the tank and a displacement of the spheres downwardly and outwardly along the posts will result in a raising of the platform with respect to the liquid level.

I claim:

1. A sewage aeration system including a rotatable aeration rotor mounted on a substantially vertical axis for partial immersion into the liquid to be aerated, a floating carrier frame for said rotator, a driving motor, said carrier frame including a platform supporting said driving motor, a driving shaft extending from said motor and connected to said aeration rotor, a plurality of supporting rods fixedly secured to said platform and extending outwardly and downwardly inclined from said platform, and a floating body mounted on each of said supporting rods for supporting said platform in floating condition above the liquid level, the improvement comprising adjustable means securing said floating bodies for movement longitudinally along said supporting rods to vary the depth of immersion of said aeration rotor in the liquid upon which the system floats.

2. A sewage aeration system comprises a tank containing liquid to be aerated, a floating carrier frame, aerating means including a motor driven aeration rotor mounted on said frame for rotation about a substantially vertical axis with a portion of said rotor immersed in the liquid, said frame including a platform with a plurality of supporting rods fixedly secured to said platform and extending outwardly and downwardly therefrom, a float body slidably mounted on each of said rods for supporting said platform sufficiently above the liquid level to support said rotor partially immersed in the liquid, vertically extended guide means extending from the inner side of said tank, and guide pin means on the outer ends of said rods loosely engaging said guide means whereby said platform and the motor driven rotor supported thereon can move freely in a vertical direction within said tank in accordance with changes in the liquid level.

3. A water aeration system according to claim 2, in which said supporting rods penetrate through said float bodies and the outer ends of the supporting rods emerging from the bodies carry a guide pin of adjustable length cooperating with said guide means on the inner wall of said tank.

4. An aeration system according to claim 2, in which a guide tube is fixedly inserted into said float body and traverses the body according to a diameter thereof, said supporting rod passing through said guide tube and means being provided for removably securing the supporting rod to said guide tube.

5. An aeration system according to claim 4, in which said guide tube is provided with radially extending arms abutting against an internal partition wall of the float body situated at right angles to the axis of said guide tube.

6. An aeration system according to claim 4, in which said float body comprises a partly spherical external layer of plastic material, the portion of said spherical layer defined by said external layer and said diametrically extending guide tube being filled with foamed plastic.